(No Model.)
S. S. NEBLETT.
TRANSPLANTER FOR TOBACCO AND OTHER PLANTS.
No. 275,253. Patented Apr. 3, 1883.
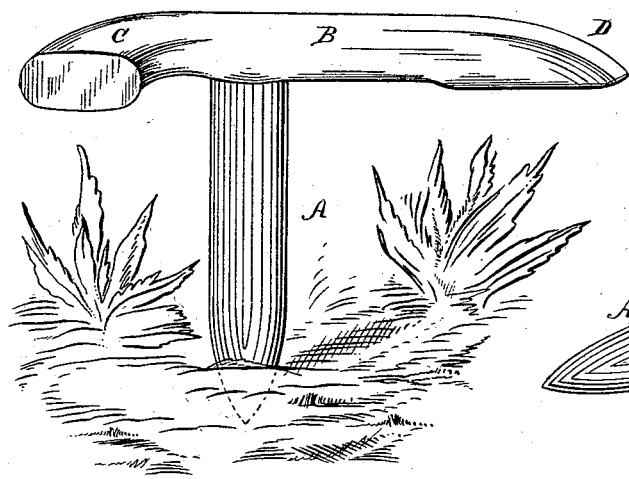
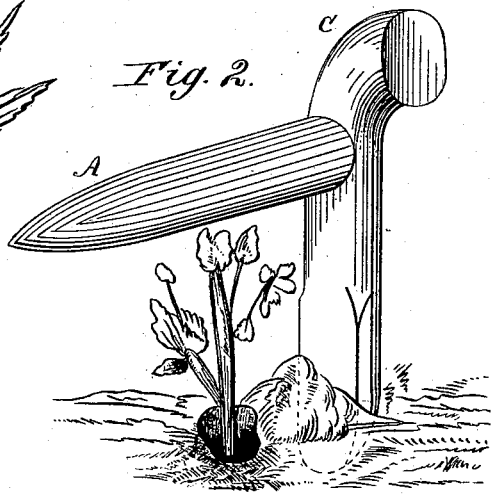
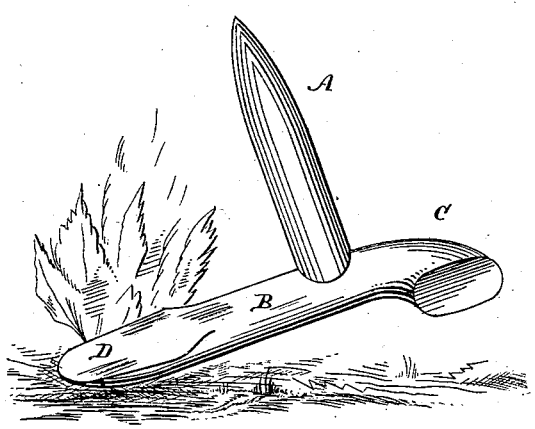
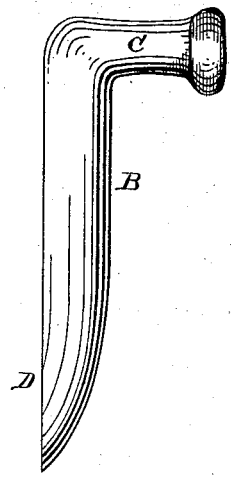
WITNESSES:
Thos Houghton.
A. G. Lyne
INVENTOR:
S. S. Neblett
BY Munn & Co
ATTORNEYS.

UNITED STATES PATENT OFFICE.

SIDNEY S. NEBLETT, OF WHITTLE'S MILLS, VIRGINIA.

TRANSPLANTER FOR TOBACCO AND OTHER PLANTS.

SPECIFICATION forming part of Letters Patent No. 275,253, dated April 3, 1883.

Application filed December 25, 1882. (No model.)

*To all whom it may concern:*

Be it known that I, SIDNEY SMITH NEBLETT, of Whittle's Mills, in the county of Lunenberg and State of Virginia, have invented a new and useful Improvement in Transplanters for Tobacco and other Plants, of which the following is a full, clear, and exact description, reference being had to the annexed drawings, forming part of this specification.

This invention relates to implements for setting out tobacco and other plants; and the invention consists of the novel construction hereinafter described and claimed.

In the drawings, Figure 1 shows the implement in position for making a hole in the ground for a plant. Fig. 2 shows the same in position for pressing the soil to the roots of the plant. Fig. 3 shows the position of the implement for completing the operation of setting a plant, and Fig. 4 is a modification of the implement.

The proper setting of plants requires that the soil shall be pressed into contact with the roots of the plants. Otherwise the plant, although it may be firmly secured in the ground at the surface of the hill, will be in danger of drying up under the heat of the sun for want of nourishment at the root.

Heretofore the cone-pointed pin with which the hole for the plant is made has been used for pressing the soil to the plant, and a headed rammer attached to such a pin has also been used for the same purpose; but, owing to the cone-shape of the point of the pin, the latter cannot be easily inserted into the ground with sufficient nearness to the root of the plant to press the soil thereto at the root; and, furthermore, the rounded surface of the point or end is not adapted to move the soil toward the plant in quantity, while the headed rammer, which also is round, is defective for the same reason.

In one form of my invention I employ the usual opening-pin, A, and to the upper end of this pin I secure a cross-piece, B, which is made plane on the under surface and rounded on the upper surface. One end of this cross-piece is curved somewhat like a plow-handle, as shown at C, and the opposite end, D, on the rounded side is beveled to a blunt edge. The curved part C serves as a handle for both the pin and the cross-piece in using said parts in turn, and it is so arranged with respect to said parts that the hand need not be moved therefrom during the operation of setting a plant. The points of the pin and the cross-piece may be made of metal, if desired.

To make a hole in a hill for a plant, the implement is to be held with the right hand in the position shown in Fig. 1 and pressed downward until the pin is inserted into the ground the required depth. After the plant is inserted into the hole the implement is to be turned to the position shown in Fig. 2, with the point of the cross-piece at a suitable distance from the plant. Then, by pressing downward, the beveled side of the cross-piece, which is turned away from the plant, will cause the point of said cross-piece to move inward toward the root of the plant, while the plane side, which is turned toward the plant, will prevent the soil from slipping around the same, so that by a single operation the soil will be pressed in quantity closely to the root of the plant. The implement is then to be withdrawn from the ground, and the hole thus left is to be closed by drawing the beveled end of the cross-piece over the same in the position shown in Fig. 3.

In a modified form of my invention I dispense with the pin A and construct the part B with the handle C turned away from its plane side, as shown in Fig. 4. The part B is in other respects constructed precisely as above described. The advantage of the modified form is that the point D will serve both for opening a hole in the ground for a plant and for pressing the soil to the root of the plant by means of the plane side and the rounded and beveled side opposite thereto.

What I claim as new, and desire to secure by Letters Patent, is—

1. A transplanter consisting of a pin to be held and operated by the hand, which is made plane on one side and rounded and beveled to a point on the opposite side, substantially as shown and described, whereby the soil will be pressed inward to the roots of the plant by simply inserting the pin into the ground at one side of the plant, as specified.

2. A transplanter consisting of the pin having one side made plane and the opposite side made rounded and beveled toward the plane side, for the purpose described, and having an opening-pin secured to its plane side at right angles thereto, substantially as shown and described.

SIDNEY SMITH NEBLETT.

Witnesses:
 N. O. NEBLETT,
 M. E. MATTHEWS.